United States Patent [19]

Furrer

[11] Patent Number: 4,665,936
[45] Date of Patent: May 19, 1987

[54] PROCESS FOR THE CONTROL OF TURBIDITY CURRENTS

[75] Inventor: Hansjörg Furrer, Ziefen, Switzerland

[73] Assignee: Lonza Ltd., Gampel/Valais, Switzerland

[21] Appl. No.: 682,242

[22] Filed: Dec. 17, 1984

[30] Foreign Application Priority Data

Jan. 4, 1984 [CH] Switzerland ............... 22/84

[51] Int. Cl.⁴ .................. F16K 3/24; F16K 25/04; F16K 31/122
[52] U.S. Cl. .......................... 137/1; 251/63; 251/324; 251/129.01; 251/31
[58] Field of Search .............. 251/31, 63, 129.01; 137/625.66, 625.69, 625.63

[56] References Cited

U.S. PATENT DOCUMENTS

| | | | |
|---|---|---|---|
| 783,671 | 2/1905 | Bloom | 251/31 X |
| 2,176,594 | 10/1937 | Nordstrom | 251/63 X |
| 2,803,266 | 8/1957 | Towler et al. | 137/625.66 X |
| 3,206,880 | 9/1965 | Rockwell et al. | 137/625.69 X |
| 3,463,188 | 8/1969 | Ryan et al. | 251/63 X |
| 3,878,859 | 4/1975 | Grob et al. | 251/129.02 X |
| 4,412,671 | 11/1983 | Tiefenthaler | 251/31 |
| 4,548,223 | 10/1985 | Kirkbride | 137/1 |

FOREIGN PATENT DOCUMENTS 596294 10/1977 Switzerland.
609728 3/1979 Switzerland.

*Primary Examiner*—Arnold Rosenthal
*Attorney, Agent, or Firm*—Fisher, Christen & Sabol

[57] ABSTRACT

Process for the control of turbidity currents, especially of high temperature lubricants in the form of graphite and polymers, suspended in water, with a viscosity of 1,000 to 20,000 cP at a temperature of up to 250 bars and a current velocity of up to 120 m/sec. Closing and opening times of 2 to 20 milliseconds are maintained. Apparatus for achieving the process, which is a switching-off valve having closing and opening times of 2 to 20 milliseconds. The switching-off valve preferably is a plunger valve.

5 Claims, 1 Drawing Figure

U.S. Patent     May 19, 1987     4,665,936
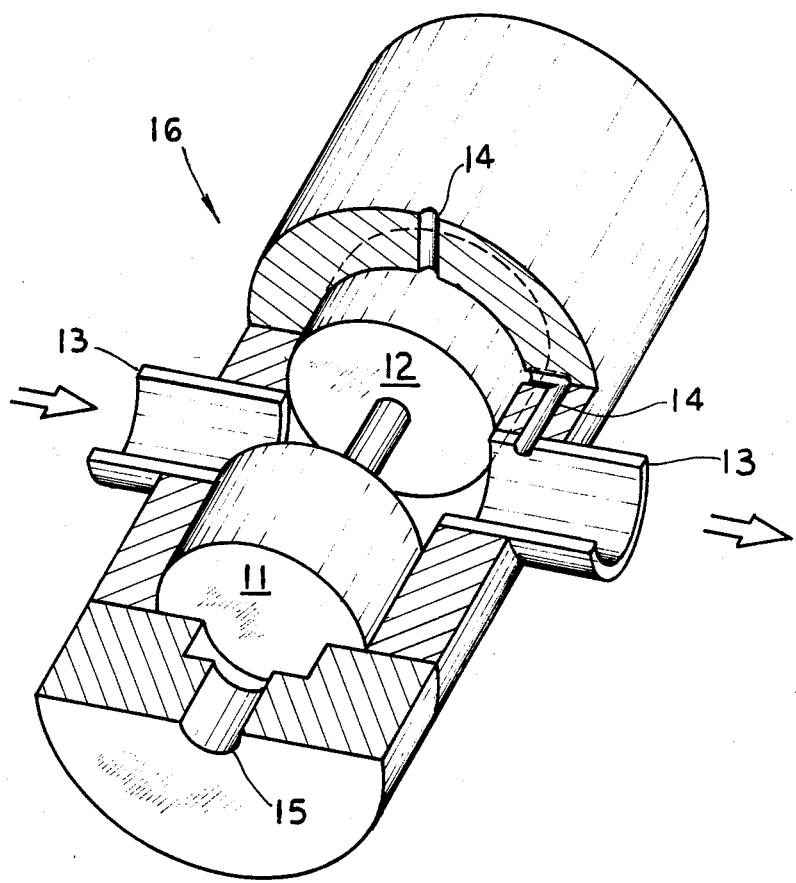

PROCESS FOR THE CONTROL OF TURBIDITY CURRENTS

BACKGROUND OF THE INVENTION

1. Field of the Invention

The invention relates to processes for the control of turbidity currents, especially of high temperature lubricants in the form of suspensions. The invention also relates to apparatus to conduct such processes.

2. Prior Art

Swiss Pat. Nos. 596,294 and 609,728 disclose high temperature lubricants containing essentially graphite, polymers and auxiliary substances, such as, stabilizers, suspended in water.

In the processing of the high temperature lubricants, they must be fed through conveying lines into the processing system and the streams of liquid must be controlled corresponding to the requirements of the processing system. In order to control the conveyed volume, switching-off valves have customary been used within the processing system. For example, neither ball valves nor cock valves available in the market have been able to satisfy the requirements. In the case of the selected pressure conditions and flow velocities, the suspensions used act in a strongly abrasive manner, and thus, wear out the moving parts of the valves. Changes in the material qualities of the parts has not brought about any essential progress. The known valves, moreover, have opening and closing times in the range of tenths of a second.

BROAD DESCRIPTION OF THE INVENTION

An object of the invention is to provide a process for the control of turbidity currents of high temperature lubricants in suspension form. Another object of the invention is to provide an apparatus to accomplish such process. A further object of the invention is to provide such process and apparatus which do not possess the above-described disadvantages of the prior art. Other objects and advantages of the invention are set out herein or are obvious herefrom to one skilled in the art.

The objects and advantages of the invention are achieved by the process and apparatus of the invention.

The invention involves an apparatus for the control of turbidity current, especially of high temperature lubricants containing graphite and polymers, suspended in water, having a viscosity of 1,000 to 20,000 cP at a pressure of up to 250 bars and a current velocity of up to 120 m/sec. The apparatus is a switching-off valve having closing and opening times of 2 to 20 milliseconds.

Control of the switching-off valve can be accomplished mechanically, electrically, electromagnetically, hydraulically and preferably pneumatically. Preferably the switching off valve is a plunger valve. The sliding surfaces of the pistons of the plunger valve preferably sealingly act against the sliding surface of the cylinder bore of the plunger valve. Preferably the piston of the plunger valve is provided with metallic seals.

The invention also involves a process for the control of turbidity currents, especially of high temperature lubricants in the form of graphite and polymers, suspended in water, having a viscosity of 1,000 to 20,000 cP at a pressure of up to 250 bars and a current velocity of up to 120 m/sec. The process maintains closing and opening times of 2 to 20 milliseconds.

Control of the switching-off valve, especially of the plunger valve, is accomplished mechanically, electrically, electromagnetically, hydraulically and preferably pneumatrically. Preferably the control is accomplished using a plunger valve.

BRIEF DESCRIPTION OF THE DRAWING

In the drawing:

The FIGURE is a partially cutaway perspective view of the plunger valve of the invention.

DETAILED DESCRIPTION OF THE INVENTION

As used herein, all parts, percentages, ratios and proportions are on a weight basis unless otherwise set out herein or otherwise obvious herefrom to one skilled in the art.

On the basis of the FIGURE and by way of example, the invention apparatus is explained in more detail below. Valve 16 consists of a double plunger (11, 12). The plunger position in the FIGURE shows open conveying line 13. Tension release line 14 is closed by means of piston part 12. In the case of the reverse operating rhythm, during closing of conveying line 13 by plunger part 11, tension release line 14 opens. By way of example, bore 15 is included in the FIGURE, as a result of which a hydraulic or pneumatic control medium can be fed in for the moving of the double plunger. Correspondingly, on the opposite side of valve 16 there is an additional bore (not shown) for feeding in the medium for the oppositely directed rhythm.

As the switching-off valves of the invention, plunger valves are preferably used (with the following detailed description primarily being based thereon). The invention also includes double plunger valves and multiple plunger valves, as well as multiple-way valves, for example 3- and 4-way valves.

The operation of the valve depends on the power sources which are available. Thus, the valve can be operated mechanically, electrically, electromagnetically, hydraulically or preferably pneumatically. Mixed drive systems, for example, mechanical ones by means of spring power for one operating rhythm and pneumatical or hydraulic for the other operating rhythm, can be used.

Double plunger valves are also especially suitable, which means that the plunger is acted upon and controlled directly with pressure.

Until now plunger valves have only been used for the control of gases and gaseous media under pressure. The control of currents of fluid using plunger valves have not previously been used in practice and plunger valves have never been used for the control of currents.

In order to satisfy the known requirements, it is necessary to produce the essential parts of the plunger valves using qualitatively high grade materials, such as, stainless steel. The gliding surfaces of the pistons act sealingly against the gliding surfaces of the cylinder bore, or else, the piston is provided with metallic seals.

The process of the invention is used for the control of turbidity currents. High temperature lubricants of the initially mentioned type represent such suspensions. In order to bring the high lubricants to the place of processing in the proper time and quantity, for example, within one operating cycle of a pipe mill, such as, a so-called continuum or pilgrim street, concerted opening and closing processes are necessary within the conveying system. The operating pressures in the conveying lines of the feed system and, correspondingly, in the valve are up to 250 bars and normally are 80 to 120 bars. The flow velocities in the conveying lines and the valves are 20 to 120 m/sec. The high temperature lubricants used have a high portion of solid substance, normally from 15 to 50 percent by weight. At 5° to 50° C., the viscosity of such suspensions ranges from 1,000 to 20,000 cP.

Complicating matters, the polymer parts act in a resinifying manner and the conveyance and control of the currents is thereby made even more difficult.

With the short opening and closing times of the invention not used heretofor, and not heretofor achievable either, the service life of the valves can surprisingly be extended by a factor of several magnitudes. Especially, the plunger valves in the case of use in the process of the invention show negligible wear and guarantee full operating safety over long periods of time.

The switching-off valves can be equipped with tension release lines which are controlled separately or likewise by way of the piston and which unblock a tension release line during closing of the conveying line on the dilivery side. Thus, any secondary flow of residual quantities which are located in the conveying lines are prevented.

By way of summary, the invention involves apparatus and process for the control of turbidity currents by means of a switching-off valve. As a rule, high temperature lubricants are used in the form of suspensions. Preferably, plunger valves are used in the invention wherein closing and opening times of 2 to 20 milliseconds are maintained.

What is claimed is:

1. A process for controlling the flow of high temperature lubricants in the form of graphite and polymers, suspended in water, having a viscosity of 1,000 to 20,000 cp, at a pressure of up to 250 bars and a current velocity of up to 120 m/sec., using a switching-off valve, comprising maintaining closing and opening times of 2 to 20 milliseconds during the operation of said valve.

2. The process as claimed in claim 1 wherein the control of the switching-off valve is accomplished mechanically, electrically, electromagnetically, hydraulically or pneumatically.

3. The process as claimed in claim 2 wherein the control of the switching-off valve is accomplished pneumatically.

4. The process as claimed in claim 2 wherein the control is accomplished using a plunger valve.

5. The process as claimed in claim 1 wherein the control is accomplished using a plunger valve.

* * * * *